United States Patent
Banerjea et al.

(10) Patent No.: US 6,771,695 B1
(45) Date of Patent: Aug. 3, 2004

(54) LOW-COMPLEXITY DMT TRANSCEIVER

(75) Inventors: Raja Banerjea, Edison, NJ (US);
Bahman Barazesh, Marlboro, NJ (US);
Yhean-Sen Lai, Warren, NJ (US);
Kannan Rajamani, Tinton Falls, NJ (US); Geoffrey L. Smith, Wall, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/364,411

(22) Filed: Jul. 30, 1999

(51) Int. Cl.[7] .............................................. H04B 1/38
(52) U.S. Cl. ..................................................... 375/222
(58) Field of Search ............................... 375/132, 138, 375/136, 144, 145, 316, 350, 222; 370/210, 208, 209, 468, 525, 526; 379/93.14

(56) References Cited

U.S. PATENT DOCUMENTS

| | | | | | |
|---|---|---|---|---|---|
| 6,128,335 | A | * | 10/2000 | Liu et al. ..................... | 375/220 |
| 6,243,414 | B1 | * | 6/2001 | Drucker et al. ............. | 375/222 |
| 6,252,901 | B1 | * | 6/2001 | Mueller et al. ............. | 375/222 |
| 6,353,644 | B1 | * | 3/2002 | Cai et al. .................... | 375/350 |
| 6,393,051 | B1 | * | 5/2002 | Koizumi et al. ............ | 375/220 |
| 6,421,377 | B1 | * | 7/2002 | Langberg et al. ........... | 375/222 |
| 6,512,789 | B1 | * | 1/2003 | Mirfakhraei ................ | 375/229 |
| 6,519,291 | B1 | * | 2/2003 | Dagdeviren et al. ....... | 375/260 |
| 6,570,912 | B1 | * | 5/2003 | Mirfakhraei ................ | 375/222 |
| 6,584,160 | B1 | * | 6/2003 | Amrany et al. ............. | 375/296 |
| 6,639,911 | B1 | * | 10/2003 | Bingham .................... | 370/352 |

OTHER PUBLICATIONS

"Asymmetric Digital Subscriber Lines," by John Cioffi, The Communications Handbook, 1997 IEEE Press, Chapter 34, 15 pages.

"Asymmetric Digital Subscriber Line (ADSL) Transceivers," ITU G.992.1 Draft Recommendation, Jul. 1999, 25 pages.

"Splitterless Asymmetric Digital Subscriber Line (ADSL) Transceiver," ITU G.992.2 Draft Recommendation, ITU COM 15–136–E Mar. 1999, 28 pages.

"Discrete–Time Signal Processing," by Alan V. Oppenheim and Ronald W. Schafter, 1989 Prentice–Hall, Inc., 8 pages.

"Network and Customer Installation Interfaces—Asymmetric Digital Subscriber Line (ADSL) Metallic Interface," T1E1.4/98–007R4, (a.k.a. T1.413 Issue 2), May 4, 1998, 10 pages.

\* cited by examiner

*Primary Examiner*—Emmanuel Bayard

(57) ABSTRACT

A DMT signal conforming to a first DMT standard (e.g., the full-rate G.dmt standard based on 255 tones) is sampled at a sampling rate for the first DMT standard, filtered to attenuate a subset of the tones of the first DMT standard (e.g., all G.dmt tones above tone #127), and subsampled (e.g., 2:1) to provide a subsampled, filtered signal that can be further processed using components designed to operate under a second, different DMT standard (e.g., the half-rate G.lite standard based on 127 tones). As such, a conventional half-rate G.lite DMT transceiver can be modified (e.g., by changing the downstream sampling rate from 1.104 MHz to 2.208 MHz and adding an appropriate low-pass filter and decimator) for configuration in a full-rate G.dmt DMT system. The filtering and subsampling ensure that a downstream signal (even if it is a full-rate DMT initialization or synchronization signal containing tones above tone #127) can successfully be further processed using conventional half-rate DMT transceiver components, which are less complex and less expensive than those of full-rate DMT transceivers, thereby enabling the use of relatively inexpensive consumer personal equipment (CPE) in existing distributed full-rate DMT telecommunications systems.

41 Claims, 2 Drawing Sheets

LOW-COMPLEXITY DMT TRANSCEIVER

BACKGROUND OF THE INVENTION

1. Field of the Invention

The present invention relates to communications systems, and, in particular, to discrete multi-tone (DMT) telecommunications systems.

2. Description of the Related Art

DMT systems transmit information encoded in multiple tones, where each tone corresponds to a modulated carrier signal having a different frequency. DMT systems conforming to the ITU G.992.1 (also known as G.dmt) standard use 255 different tones corresponding to a bandwidth of 1.104 MHz. Such DMT systems are referred to herein as full-rate DMT systems. DMT systems conforming to the ITU G.992.2 (also known as G.lite) standard use 127 different tones corresponding to a bandwidth of 0.552 MHz. Such DMT systems are referred to herein as half-rate DMT systems. The first 127 tones of the 255-tone G.dmt standard (i.e., tones #1–127) have the same carrier frequencies as the 127 tones of the G.lite standard. The tones (i.e., sub-carriers) are at $i*F$ KHz, where $i=1, \ldots, 255$ and $F=4.3125$ KHz is the frequency spacing between tones. Note that the set of G.lite tones is different from the set of G.dmt tones even though they have tones in common (i.e., tones #1–127), because at least one set (i.e., the set of G.dmt tones) has one or more tones (i.e., tones #128–255) that are not in the other set (i.e., the set of G.lite tones).

In typical distributed DMT telecommunications systems based on either the G.dmt or G.lite standard, tones #1–31 are reserved for upstream transmissions from the client (e.g., consumer personal equipment (CPE)) to the centralized facility (e.g., central office (CO)), while the remaining tones (i.e., tones #32–255 for full-rate DMT systems and tones #32–127 for half-rate DMT systems) are reserved for downstream transmissions from the CO to the client. If echo cancellation is supported at both the CO and the client, then the DMT system can operate in an overlapped spectrum mode, where tones #1–31 are used for both upstream and downstream transmissions. General conventional DMT transceivers are described in further detail in John Cioffi, *The communications handbook*, Chapter 34, "Asymmetric Digital Subscriber Lines," IEEE Press 1997, the teachings of which are incorporated herein by reference.

At the beginning of each connection, certain initialization operations (e.g., transceiver training, channel analysis, message exchange, and bit loading) are performed so that each node (i.e., the client and the CO) can select which of the available tones it wishes the transmitter of the other node to use during datamode (i.e., "non-initialization") transmissions. As part of these initialization operations, the CO transmits initialization signals, such as reverb and medley, containing all of the downstream tones to the client, and the client selects the one or more particular tones that the client wishes the CO's transmitter to use for datamode downstream transmissions. Thus, during initialization operations in a full-rate DMT system, the CO transmits up to 255 tones to the client and the client responds by selecting a subset of those 255 tones. Similarly, in half-rate DMT systems, the CO transmits up to 127 tones to the client and the client responds by selecting a subset of those 127 tones. After initialization operations are complete, the CO will use the tones selected by the client for datamode downstream transmissions (and the client will use tones selected by the CO for datamode upstream transmissions).

Because the bandwidth of full-rate DMT systems is twice that of half-rate DMT systems (i.e., 1.104 MHz vs. 0.552 MHz), the circuitry used to generate and/or process signals in full-rate DMT systems is typically more complex than that used for half-rate DMT systems. In particular, the minimum sampling rate by a receiver in a full-rate DMT system is twice the minimum sampling rate by a receiver in a half-rate DMT system (e.g., 2.208 MHz vs. 1.104 MHz). The higher sampling rate results in greater circuit complexity in various other components of a full-rate DMT receiver, such as the time-domain equalizer (TDQ), the echo canceller, and the fast Fourier transform (FFT) processor. The TDQ is a digital filter that is trained to shorten the impulse response of the channel to a length less than the length of the cyclic prefix. The echo canceller removes interference from the transmit signal to the receive band. It can be used advantageously in the non-overlapped spectrum case to provide substantial performance improvement. The FFT converts the time-domain signal to a frequency-domain signal. Due to the higher sampling rate of the full-rate DMT system as compared to the half-rate DMT system, an FFT in a full-rate DMT receiver is typically at least twice as complex as an FFT in a half-rate DMT receiver (e.g., a 512-point FFT vs. a 256-point FFT).

SUMMARY OF THE INVENTION

The present invention is directed to a technique for implementing low-complexity—and therefore low-cost—DMT transceivers in full-rate DMT communications systems. According to embodiments of the present invention, a slightly modified, half-rate DMT transceiver conforming to the ITU G.992.2 (G.lite) standard can be connected to a full-rate DMT system conforming to the ITU G.992.1 (G.dmt) standard. The prior art does not support such interconnection of components conforming to different DMT standards. As such, the present invention enables the use of low-cost DMT equipment in already deployed full-rate DMT systems.

In one embodiment, the present invention is a method for processing a received discrete multi-tone (DMT) signal conforming to a first DMT standard based on a first set of tones, comprising the steps of (a) sampling and filtering the received DMT signal to generate a filtered, sampled DMT signal; and (b) further processing the filtered, sampled DMT signal based upon a second DMT standard based on a second set of tones different from the first set of tones.

In another embodiment, the present invention is an apparatus for processing a received DMT signal conforming to a first DMT standard based on a first set of tones, comprising (a) an analog-to-digital (A/D) converter and one or more filters configured to sample and filter the received DMT signal to generate a filtered, sampled DMT signal; and (b) additional components configured to further process the filtered, sampled DMT signal based upon a second DMT standard based on a second set of tones different from the first set of tones.

BRIEF DESCRIPTION OF THE DRAWINGS

Other aspects, features, and advantages of the present invention will become more fully apparent from the following detailed description, the appended claims, and the accompanying drawings in which

DETAILED DESCRIPTION

Figure 1:
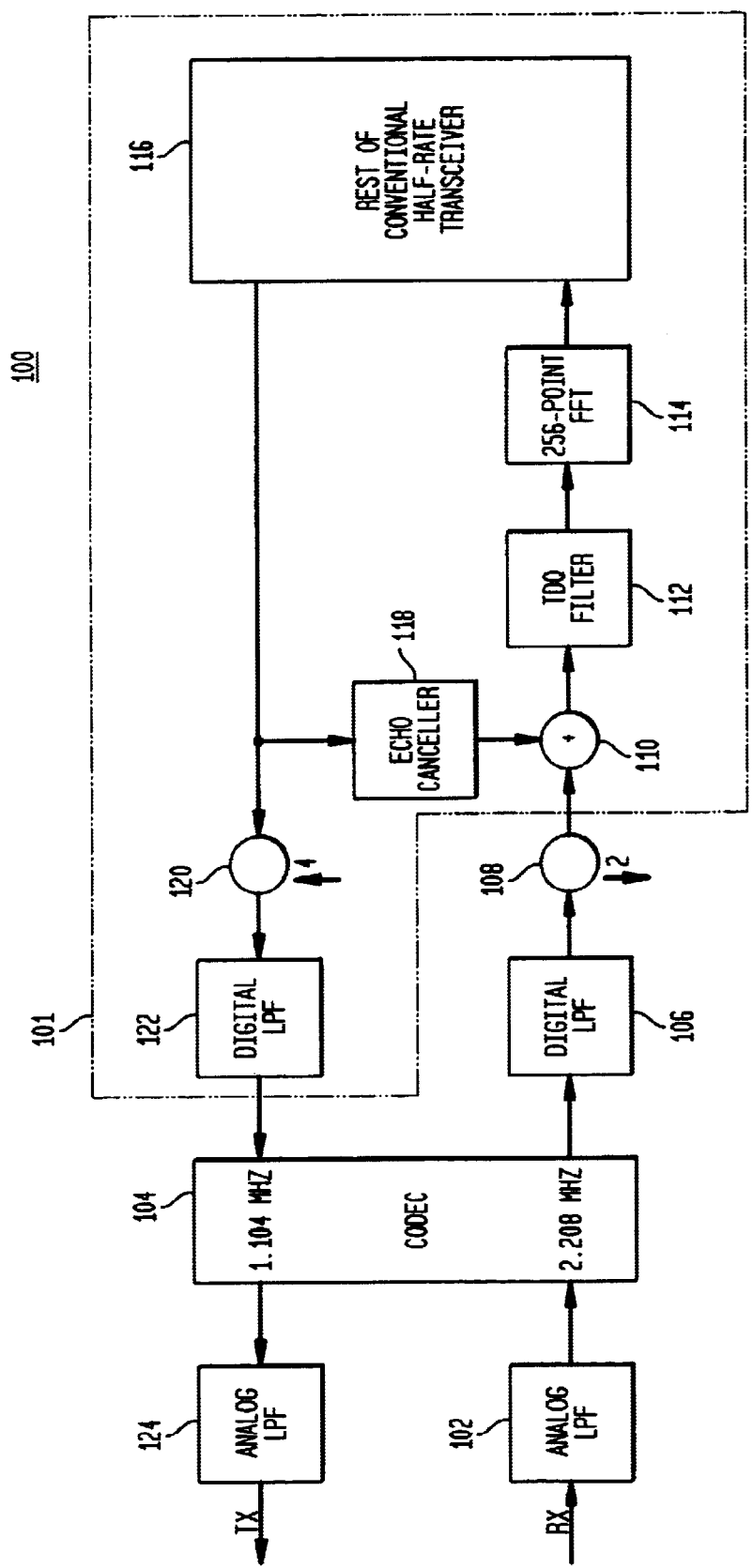
FIGS. 1 and 2 show block diagrams of DMT transceivers according to alternative embodiments of the present invention.

FIG. 1 shows a block diagram of a DMT transceiver 100, according to one embodiment of the present invention.

Transceiver 100 can be configured as a client in an existing full-rate DMT system conforming to the G.dmt standard to receive downstream signals (RX) from a central office of the full-rate DMT system and transmit upstream signals (TX) to the CO.

Transceiver 100 comprises an (optional) analog low-pass filter (LPF) 102, a codec 104, a digital low-pass filter 106, a 2:1 decimator 108, and other components 110–124 that are typically found in a conventional half-rate DMT transceiver (101) that conforms to the G.lite standard. In particular, these other components include summation block 110, echo canceller 118, time-domain equalizer (TDQ) filter 112, 256-point FFT 114, an interpolator consisting of 1:4 upsampler 120 and digital low-pass filter 122, and an analog low-pass filter 124. Note that 256-point FFT 114 is a real-input, complex-output FFT having 256 real inputs and 128 complex outputs.

As indicated in FIG. 1, after possible filtering by optional analog filter 102, codec 104 operates as an analog-to-digital (A/D) converter by sampling the downstream signal at a rate of 2.208 MHz corresponding to the sampling rate of full-rate DMT systems. Digital filter 106 filters the resulting sampled data stream to attenuate tones #128–255 of the G.dmt standard and decimator 108 subsamples the filtered data stream by a factor of 2 to bring the sample rate down to 1.104 MHz. The resulting subsampled, filtered data stream is then processed by the rest of the components of transceiver 100 as if it were derived from a conventional half-rate DMT signal. In particular, summation block 110 adds a conventional half-rate echo cancellation signal generated by half-rate echo canceller 118, TDQ filter 112 applies conventional half-rate time-domain equalization filtering, and 256-point FFT 114 performs conventional half-rate FFT processing to recover the information encoded into the downstream signal RX. Transceiver 100 generates the upstream signal TX using conventional half-rate DMT processing, including digital-to-analog (D/A) processing by codec 104 based on a 1.104-MHz clock.

The downstream sampling by codec 104 at 2.208 MHz and the addition of digital filter 106 and decimator 108 correspond to a pre-processing function that enables an otherwise conventional half-rate DMT transceiver (101) to be successfully implemented in a full-rate DMT system. In particular, during initialization operations, when the CO transmits at least tones #32–255 to transceiver 100, filter 106 attenuates tones #128–255 and decimator 108 converts the 2.208-MHz sampling rate by codec 104 to a 1.104-MHz sampling rate to provide a signal that "looks" like a conventional half-rate DMT initialization signal that can be further processed using conventional half-rate components. During initialization operations, transceiver 100 selects a subset of tones below tone #128 for the CO to use for datamode downstream transmissions. Without filter 106 and decimator 108, a conventional half-rate DMT transceiver would suffer aliasing effects that would cause these initialization operations to fail.

During datamode operations, the CO will transmit information to transceiver 100 encoded into a full-rate downstream signal consisting of the subset of tones below tone #128 selected by the client during initialization operations. As in initialization operations, during datamode operations, the downstream signal will be sampled at 2.208 MHz by codec 104 (to avoid aliasing), filtered by filter 106, and downsampled by decimator 108 to provide a signal that looks like a conventional datamode half-rate downstream signal that can be further processed by an otherwise conventional half-rate transceiver 101. When the CO transmits full-rate synchronization frames containing tones above tone #127 (e.g., once in 69 frames during datamode operations), filter 106 will attenuate those higher tones. During the rest of datamode operations, filter 106 will have no effect on the downstream signal, since the downstream signal transmitted by the CO during those datamode operations will not contain any tones above tone #127.

Under the present invention, the central office is completely unaware that the client's transceiver 100 is anything but a conventional full-rate DMT transceiver that, for some reason unknown to the CO, does not select any of tones #128–255 during initialization operations. As such, the CO will process the upstream signal generated by transceiver 100 using conventional full-rate DMT processing.

As shown in FIG. 1, in the downstream direction, codec 104 samples the downstream signal at a rate of 2.208 MHz and decimator 108 subsamples by a factor of 2. In alternative embodiments, codec 104 could sample the downstream signal at a higher rate (e.g., 4.416 MHz) with decimator 108 subsampling by a corresponding higher factor (e.g., 4). Similarly, as shown in FIG. 1, in the upstream direction, upsampler 120 upsamples by a factor of 4 and codec 104 generates the upstream signal using a 1.104-MHz clock. In alternative embodiments, upsampler 120 could upsample by a different factor and codec 104 could generate the upstream signal using a corresponding different clock. For example, upsampler 120 could upsample by a factor of 8 and codec 104 could generate the upstream signal using a 2.208-MHz clock. By the same token, upsampler 120 could upsample by a factor of 2 and codec 104 could generate the upstream signal using a 0.551-MHz clock.

The splitting of the filtering between analog and digital filters with the addition of optional analog filter 102 enables the implementation of a less-complex (i.e., lower-order) digital low-pass filter for filter 106. It may also be possible to eliminate digital filter 106 completely with an appropriate implementation of analog filter 102. In either case, with an appropriate implementation of analog filter 102, it may be possible to sample the downstream signal at a rate lower than 2.208 MHz and still avoid aliasing. Moreover, if codec 104 could sample the downstream signal at a rate of 1.104 MHz, then decimator 108 could be eliminated.

Figure 2:
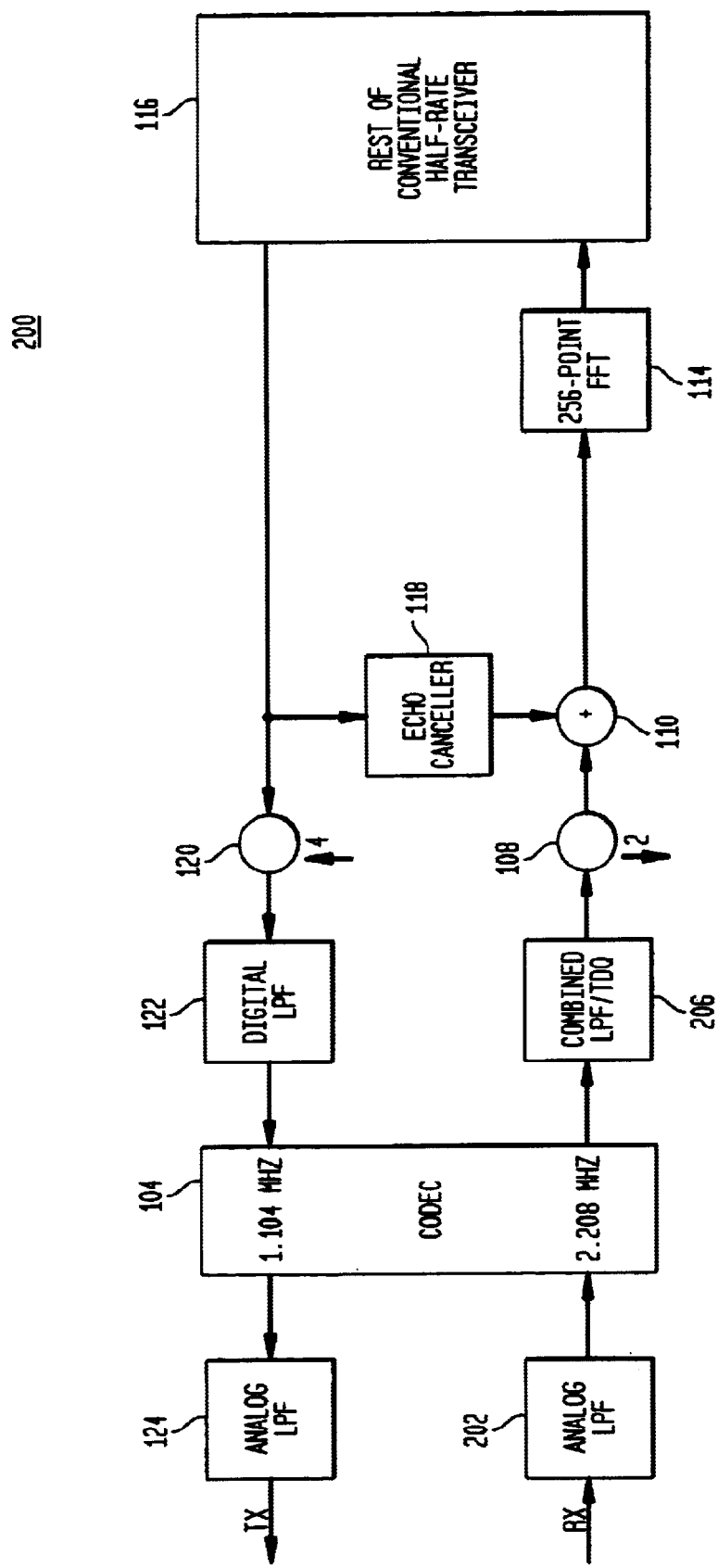

FIG. 2 shows a block diagram of a DMT transceiver 200, according to an alternative embodiment of the present invention. Transceiver 200 is similar to transceiver 100 of FIG. 1, except that time-domain equalizer filter 112 of transceiver 100 is combined with digital low-pass filter 106 of transceiver 100 to form a single combined digital LPF/TDQ filter (206 in FIG. 2). As such, this implementation may further simplify the circuitry involved in implementing the present invention.

Combining the TDQ filter with the digital low-pass filter involves implementing the time-domain equalization function before the occurrence of the downsampling function of the decimator. Moving the TDQ filter before the decimator results in interleaving the filter with zeros. As such, the transfer function of the TDQ filter changes from a first-order function $H_{tdq}(z)$ to a second-order function $H_{tdq}(z^2)$ Since the transfer function $H_d(z)$ of the low-pass filter and the transfer function $H_{tdq}(z^2)$ of the TDQ filter are linear and time-invariant, these two filters can be combined into one linear, time-invariant (LTI) filter. The transfer function $H_c(z)$ of the resulting combined LTI filter 206 is the convolution of the transfer functions of the low-pass and TDQ filters, which is given as follows:

$$H_c(z) = H_d(z) \cdot H_{tdq}(z^2)$$

If the lengths of $H_d(z)$ and $H_{tdq}(z)$ are L and M, respectively, then the length of $H_{tdq}(z^2)$ will be 2M and the length of the combined filter will be (L+2M−1). To reduce the length of the combined filter, windowing may be implemented using a Blackman-Harris window or a Kaiser window, such that the transfer function $H_{win}(z)$ of the reduced, combined filter is given as follows:

$$H_{win}(z)=H_d(z)\ H_{tdq}(z^2)\ W(z)$$

where W(z) is the window function, as described in Alan V. Oppenheim and Ronald W. Schafer, *Discrete Time Processing of Signals*, Prentice Hall of India Pvt Ltd, 1982, the teachings of which are incorporated herein by reference.

The combined filter 206 of FIG. 2 provides additional advantages to the present invention. Implementing a single filter instead of two separate filters (e.g., low-pass filter 106 and TDQ filter 112 of FIG. 1) reduces implementation complexity by eliminating an extra buffer read/write and initialization operation. When a cyclic prefix (CP) is added, the decimator filtering of extra samples of CP is eliminated and echo cancellation of the CP samples is also eliminated.

Similar to transceiver 100, transceiver 200 may be implemented with optional analog low-pass filter 202 prior to codec 104 to even further simplify the complexity of filter 206. Otherwise, the design and processing of the rest of the components of transceiver 200 can be identical to the design and processing of the corresponding components in transceiver 100. Like transceiver 100, transceiver 200 will successfully perform initialization operations when configured as a client to a CO of a full-rate DMT system.

The present invention provides many advantages over the prior art. A significant advantage of the present invention over the prior art is the ability to implement low-complexity, low-cost transceivers in existing full-rate DMT systems. The additional cost involved in adding a low-pass filter and a decimator to a conventional half-rate DMT transceiver is much less than the cost differential between half-rate and full-rate DMT transceivers. These modified half-rate DMT transceivers can successfully initialize in the presence of full-rate tones above tone #127 with a signal-to-noise ratio virtually identical to the half-rate case in which these tones are not present. In addition, the presence of a low-pass filter, such filters 106 and 206 in FIGS. 1 and 2, respectively, operates to filter out undesirable interference signals, such as AM radio interference that is often present in tones above tone #127.

The maximum bandwidth available for transceivers 100 and 200 will be limited to the 0.552 MHz of a half-rate DMT transceiver, instead of the 1.104 MHz of a full-rate DMT transceiver, but that lower bandwidth level will be sufficient for many useful client applications. The lower tones (i.e., tones #32–127) are typically more useful than the higher tones (i.e., tones #128–255), since they are less affected by loop attenuation and maintain good signal-to-noise ratios over a wide variety of local loops. Thus, the negative impact of the present invention in not being able to use the higher tones is even further diminished.

Although the present invention has been described in the context of configuring a relatively low-complexity DMT transceiver as a client in a full-rate DMT system conforming to the G.dmt standard, it will be understood that the present invention can also be implemented in other contexts. In general, the principles of the present invention may be implemented for equipment conforming to two different DMT standards having at least some tones in common. For example, DMT transceivers conforming to either the G.dmt full-rate standard or the G.lite half-rate standard could be modified using the principles of the present invention to be implemented in a 511-tone DMT system, where the first 255 tones of the 511-tone DMT system were the 255 tones of the G.dmt standard. Although the present invention has been described in the context of a client transceiver, the present invention can also be implemented at a CO transceiver. Moreover, the present invention can be implemented in the context of DMT communications systems other than distributed DMT telecommunications systems having central offices and clients.

While the exemplary embodiments of the present invention have been described with respect to processes of circuits, including possible implementation as a single integrated circuit, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for processing a received discrete multi-tone (DMT) signal conforming to a first DMT standard based on a first set of tones, comprising the steps of:
    (a) sampling and filtering the received DMT signal to generate a filtered, sampled DMT signal; and
    (b) further processing the filtered, sampled DMT signal based upon a second DMT standard based on a second set of tones different from the first set of tones.

2. The invention of claim 1, wherein:
    the first DMT standard is a G.dmt standard and the first set of tones consists of tones #1–255;
    the second DMT standard is a G.lite standard and the second set of tones consists of tones #1–127 of the first set of tones; and
    step (b) comprises the step of applying conventional G.lite transceiver processing to the filtered, sampled DMT signal.

3. The invention of claim 2, wherein step (b) comprises the step of applying a 256-point fast Fourier transform (FFT) to recover information in the received DMT signal.

4. The invention of claim 2, wherein step (a) comprises the steps of:
    (1) sampling the received DMT signal at about 2.208 MHz;
    (2) filtering the sampled DMT signal to attenuate all tones above tone #127; and
    (3) 2:1 downsampling the filtered DMT signal to generate the filtered, sampled DMT signal.

5. The invention of claim 1, further comprising the step of generating and transmitting an upstream DMT signal conforming to the second DMT standard simultaneously with steps (a) and (b).

6. The invention of claim 1, wherein step (a) comprises the steps of:
    (1) sampling the received DMT signal at a rate corresponding to the first DMT standard;
    (2) filtering the sampled DMT signal to attenuate a subset of the first set of tones; and
    (3) downsampling the filtered DMT signal to generate the filtered, sampled signal.

7. The invention of claim 6, step (a)(1) further comprised the step of filtering the received DMT signal before sampling.

8. The invention of claim 7, wherein the filtering of step (a)(1) is analog filtering and the filtering of step (a)(2) is digital filtering.

9. The invention of claim 6, wherein the filtering of step (a)(2) further comprises time-domain equalization (TDQ) filtering corresponding to the second DMT standard.

10. The invention of claim 1, wherein the received DMT signal is a downstream signal transmitted by a central office (CO) of a distributed DMT telecommunications system conforming to the first DMT standard.

11. The invention of claim 1, wherein the received DMT signal is an initialization signal comprising one or more tones not in the second set of tones.

12. The invention of claim 1, wherein the received DMT signal is a synchronization frame signal comprising one or more tones not in the second set of tones.

13. The invention of claim 1, wherein:

the first DMT standard is a G.dmt standard and the first set of tones consists of tones #1–255;

the second DMT standard is a G.lite standard and the second set of tones consists of tones #1–127 of the first set of tones;

the received DMT signal is a downstream signal transmitted by a CO of a distributed DMT telecommunications system conforming to the G.dmt standard;

the received DMT signal is an initialization or synchronization frame signal comprising one or more tones above tone #127;

step (a) comprises the steps of:
  (1) sampling the received DMT signal at about 2.208 MHz;
  (2) digital filtering the sampled DMT signal to attenuate all tones above tone #127; and
  (3) 2:1 downsampling the filtered DMT signal to generate the filtered, sampled DMT signal; and step (b) comprises the step of applying conventional G.lite transceiver processing to the filtered, sampled DMT signal including the step of applying a 256-point FFT to recover information in the received DMT signal; and further comprising the step of generating and transmitting an upstream DMT signal conforming to the G.lite standard simultaneously with steps (a) and (b).

14. The invention of claim 13, step (a)(1) further comprised the step of analog filtering the received DMT signal before sampling.

15. The invention of claim 13, wherein the filtering of step (a)(2) further comprises TDQ filtering corresponding to the G.lite standard.

16. An apparatus for processing a received DMT signal conforming to a first DMT standard based on a first set of tones, comprising:

(a) an analog-to-digital (A/D) converter and one or more filters configured to sample and filter the received DMT signal to generate a filtered, sampled DMT signal; and (b) additional components configured to further process the filtered, sampled DMT signal based upon a second DMT standard based on a second set of tones different from the first set of tones.

17. The invention of claim 16, wherein:

the first DMT standard is a G.dmt standard and the first set of tones consists of tones #1–255;

the second DMT standard is a G.lite standard and the second set of tones consists of tones #1–127 of the first set of tones; and the additional components are configured to apply conventional G.lite transceiver processing to the filtered, sampled DMT signal.

18. The invention of claim 17, wherein the additional components comprise a 256-point FFT to recover information in the received DMT signal.

19. The invention of claim 17, wherein:

the A/D converter is configured to sample the received DMT signal at about 2.208 MHz;

a first filter is configured to filter the sampled DMT signal to attenuate all tones above tone #127; and a decimator is configured to 2:1 downsample the filtered DMT signal to generate the filtered, sampled DMT signal.

20. The invention of claim 16, wherein the additional components comprise transmitter components configured to generate and transmit an upstream DMT signal conforming to the second DMT standard simultaneously with the processing of the received DMT signal.

21. The invention of claim 16, wherein:

the A/D converter is configured to sample the received DMT signal at a rate corresponding to the first DMT standard;

a first filter is configured to filter the sampled DMT signal to attenuate a subset of the first set of tones; and a decimator is configured to downsample the filtered DMT signal to generate the filtered, sampled signal.

22. The invention of claim 21, wherein a second filter is configured to filter the received DMT signal before sampling.

23. The invention of claim 22, wherein the second filter is an analog filter and the first filter is a digital filter.

24. The invention of claim 21, wherein the first filtering is further configured to perform TDQ filtering corresponding to the second DMT standard.

25. The invention of claim 16, wherein the received DMT signal is a downstream signal transmitted by a CO of a distributed DMT telecommunications system conforming to the first DMT standard.

26. The invention of claim 16, wherein the received DMT signal is an initialization signal comprising one or more tones not in the second set of tones.

27. The invention of claim 16, wherein the received DMT signal is a synchronization frame signal comprising one or more tones not in the second set of tones.

28. The invention of claim 16, wherein:

the first DMT standard is a G.dmt standard and the first set of tones consists of tones #1–255;

the second DMT standard is a G.lite standard and the second set of tones consists of tones #1–127 of the first set of tones;

the received DMT signal is a downstream signal transmitted by a CO of a distributed DMT telecommunications system conforming to the G.dmt standard;

the received DMT signal is an initialization or synchronization frame signal comprising one or more tones above tone #127;

the A/D converter is configured to sample the received DMT signal at about 2.208 MHz;

a digital filter is configured to filter the sampled DMT signal to attenuate all tones above tone #127;

a decimator is configured to 2:1 downsample the filtered DMT signal to generate the filtered, sampled DMT signal; and the additional components are configured to apply conventional G.lite transceiver processing to the filtered, sampled DMT signal, wherein the additional components comprise:
- (1) a 256-point FFT configured to recover information in the received DMT signal; and
- (2) transmitter components configured to generate and transmit an upstream DMT signal conforming to the G.lite standard simultaneously with the processing of the received DMT signal.

29. The invention of claim 28, an analog filter is configured to filter the received DMT signal before sampling.

30. The invention of claim 28, wherein the digital filter is further configured to perform TDQ filtering corresponding to the G.lite standard.

31. The invention of claim 1, wherein the filtered, sampled DMT signal conforms to the second DMT standard.

32. The invention of claim 16, wherein the filtered, sampled DMT signal conforms to the second DMT standard.

33. The invention of claim 4, wherein the filtering of the sampled DMT signal does not attenuate tones below tone #128.

34. The invention of claim 19, wherein the filtering of the sampled DMT signal does not attenuate tones below tone #128.

35. The invention of claim 6, wherein the filtering of the sampled DMT signal does not attenuate the rest of the first set of tones.

36. The invention of claim 21, wherein the filtering of the sampled DMT signal does not attenuate the rest of the first set of tones.

37. The invention of claim 6, wherein the subset of the first set of tones is not part of the second set of tones.

38. The invention of claim 21, wherein the subset of the first set of tones is not part of the second set of tones.

39. A transceiver, comprising:
- receiver front-end circuitry adapted to sample and filter a received DMT signal conforming to the G.dmt standard to generate a filtered, sampled DMT signal;
- receiver back-end circuitry adapted to further process the filtered, sampled DMT signal based on the G.lite standard; and
- transmitter circuitry adapted to generate and transmit a DMT signal conforming to the G.lite standard simultaneously with the processing of the received DMT signal by the receiver front-end circuitry and back-end circuitry, wherein the transceiver is adapted to support bidirectional communications with one or more transceivers conforming to the G.dmt standard.

40. The invention of claim 39, wherein the receiver back-end circuitry comprises a time-domain-to-frequency-domain converter conforming to the G.lite standards.

41. The invention of claim 40, wherein the time-domain-to-frequency-domain converter implements a 256-point FFT.

* * * * *